United States Patent [19]

Fryrear, Jr. et al.

[11] 3,738,427
[45] June 12, 1973

[54] HORSESHOEING
[76] Inventors: William A. Fryrear, Jr., 8820 St. Anthony Church Rd., Louisville, Ky. 40214; Joseph R. Metcalf, 914 Flintlock Dr., Louisville, Ky. 40216
[22] Filed: Nov. 16, 1971
[21] Appl. No.: 199,252

Related U.S. Application Data
[63] Continuation-in-part of Ser. No. 869,616, Oct. 27, 1969, abandoned.

[52] U.S. Cl. .................................. 168/4, 168/10
[51] Int. Cl. .................................................. A01l 1/00
[58] Field of Search ............... 168/4, 18, DIG. 1, 168/10; 164/376

[56] References Cited
UNITED STATES PATENTS

| | | |
|---|---|---|
| 3,506,072 | 4/1970 | McFarland et al. ................. 168/19 |
| 3,524,505 | 8/1970 | Ross ................................... 168/4 |
| 3,285,346 | 11/1966 | Jenny et al. ........................ 168/4 |
| 3,587,722 | 6/1971 | Slansky ............................. 164/376 |

Primary Examiner—Aldrich F. Medbery
Attorney—Norman L. Wilson

[57] ABSTRACT

In the case of horses, particularly thoroughbreds, hoof care has not advanced along with careful breeding, scientific feeding and exercising, training methods and medical conditioning. A custom, and hence a perfectly fitting, horseshoe can be made. In addition the fit of conventional horseshoes can be improved, and injured portions of the sole can be protected.

8 Claims, 13 Drawing Figures

PATENTED JUN 12 1973 3,738,427

INVENTOR.
WILLIAM A. FRYREAR, JR
JOSEPH R. METCALF
BY
Norman L. Wilson, Jr.
THEIR ATTORNEY

HORSESHOEING

This invention is a continuation-in-part of our application Ser. No. 869,616 filed Oct. 27, 1969 and now abandoned.

BACKGROUND OF THE INVENTION

This invention pertains to horseshoeing. In one of its aspects the invention relates to means for better fitting shoes to the hoof. In another aspect means are provided for protecting both the wall and the sole of a horse's hoof.

The hooves of a horse take more wear than any other part of the horse's body. They are also the most likely to become diseased or injured. The horse is known to be no better than its feet; yet most foot troubles are due to lack of attention and abuse. All colts are not foaled with straight legs. Corrective shoeing or shoes with calks are necessary in such instances. Except in race horses, the feet are the most neglected parts of the horse. Even in the case of race horses, hoof care has not advanced with careful breeding, scientific feeding and exercising, training methods, and medical conditioning. In fact, training of thoroughbreds generally begins before colts really should be wearing shoes. Running barefoot favors growth whereas early shoeing may result in a narrow foot, and hence an underdeveloped frog. Accordingly shoes must be carefully fitted and frequently checked and changed.

It is an accepted fact that shoeing interferes with physiological movements of the hoof, alters them, and suppresses them. Shoeing thus is a necessary evil. Hence in shoeing, consideration should be given to the functions of the hoof and particularly to the bearing surfaces thereof. For example in shoeing colts, faulty shoeing can make a straight leg crooked. Likewise corrective shoeing can make a crooked leg straight.

It can thus be seen that the foremost consideration in shoeing horses is that of improving the foot. It is essential that the proper angle with the ground be maintained. In addition the bearing edge of the hoof wall does not always wear away evenly. At times, if a horse steps on a rock or other object, portions of the hoof wall also break away. In trimming the bearing edge of a hoof, jagged pieces can be clipped off, or the edge can be evened with a rasp, only until the frog touches the ground. If the hoof wall is not level when the frog touches the ground, the shoe will not fit properly.

Even when the bearing surface of the hoof is level so that a shoe would otherwise fit properly, not infrequently the bearing surface is too narrow. The result is a saucer shoe rather than a seated shoe, a seated shoe being a shoe in which the bearing surface of the hoof rests on the entire upper surface of the shoe, a saucer shoe being a shoe which rests only on the outer edge of the bearing surface of the hoof wall. Convex soles also create shoeing problems. In addition there are times when it is impossible to detect the fact that horses are improperly shod. Visible dished portions and brightly polished spots on the upper surface of a shoe show that scouring occurs between the horn and the metal. It appears that there are almost always small imperfections or irregularities in the bearing edge of the hoof wall so that all points of this edge do not rest and wear equally on the horseshoe. This is apparent from the fact that although not visible, there is some wearing away of the hoof. Lameness in horses which cannot be diagnosed is sometimes cured by removing shoes. It is also known that improper shoeing may lead to various diseases of the feet. It is evident, therefore, that there are many reasons for the advancement of methods of producing and fitting horseshoes. These is also a need for covering or protecting more than the hoof wall. Frequently rocks, pebbles and other sharp objects gash, cut or bruise the sole of the foot. Ordinary shoeing, of course, does not afford any protection to such injured sole areas.

SUMMARY OF THE INVENTION

In one of its embodiments this invention provides a process by which a custom, and hence a perfectly fitting, horseshoe can be made for each hoof. In another embodiment of the invention means are provided improving the fit of conventional horseshoes in cases where the shoe cannot be completely seated. Thus according to the practice of this invention horseshoeing is provided seating against the entire bearing edge of a hoof wall whether the wall is imperfect due to an irregular or broken away bearing edge, or whether the bearing edge is so narrow that a saucer shoe would result. The invention also provides a means for protecting injured sole portions. Where a standard shoe is employed, patterns, i.e., models, of shims are made of a low melting casting material to fit precisely between the shoe and the bearing edge of the hoof wall. Molds are then made, i.e., the patterns are covered or invested to form cavities so that plastic or metal shims can be cast. The shoe is thus perfectly fitted. If a custom shoe is desired, an entire wax model of the shoe can be made and cast. A sole protecting plate can also be cast of a softer plastic material.

DETAILED DESCRIPTION OF THE INVENTION

In one of the wax elimination methods of casting, an accurate pattern of the desired appliance framework is formed of a low melting casting material such as wax or a low melting thermoplastic resin. Around this pattern a mold is formed of refractory material. Molten metal or plastic can then be forced into the cavity to form a metal or plastic reproduction of the original wax or resin pattern or model.

In the practice of one embodiment of this invention a functional impression of the horse's hoof is made, and from this impression casts can be made of the hoof. A standard horseshoe in combination with casting plastic or wax models of shims, i.e., leveling plates, can then be precisely fitted to the master cast, or a wax model of an entire shoe can be constructed to conform to the bearing edge of the hoof wall. Metal shoes, or plastic or metal shims, are then cast. The wax or plastic shoe or the shim patterns can, of course, be fit and fabricated directly on the hoof. However this method is somewhat more difficult, and will be dependent upon the farrier and the temperament of the horse. The procedure will be used where time is a factor, such as in the case of an injury or torn hoof.

A more complete understanding of the invention will perhaps result from a detailed description of the invention in conjunction with the accompanying drawings. In the drawings FIG. 1 is a view of the bottom of a hoof showing the bearing edge.

Figure 1:
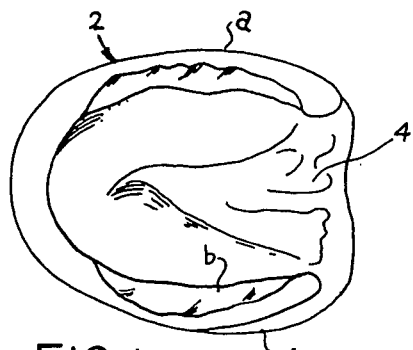
Figure 5:
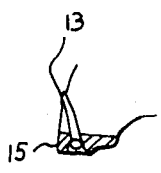
FIGS. 5 through 8 are sectional views showing how shoes rest on the bearing edge.
Figure 6:
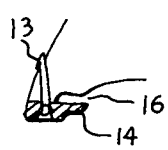

In FIG. 1 can be seen the bottom of a horse's hoof 2 much as it would appear if the leg were lifted by a farrier for shoeing. The frog 4 and the wall 6 can be seen as they normally appear. The wall 6 of this foot is rather typical; yet it can be seen that it is not a perfect surface. It is cupped at *a* so that the wall is thinner at this point. The wall is also worn away and irregular at *b*. Obviously a shoe bearing against the edge of the hoof wall at *b* will not be perfectly seated. The fit of the shoe at *a* presents an even more serious problem termed a saucer fit. A saucer shoe 14 is shown in FIG. 6. The bearing surface of the hoof wall should extend across the full width of a horseshoe as shown in the case of shoe 15 in FIG. 5. A firm surface is thereby provided to support the full weight to be borne by the foot. When a portion of the bearing edge of a hoof wall is cupped or otherwise recedes as shown in FIG. 6, the shoe is also ill-fitting as can be seen. These two defects are illustrative of the various defects encountered in shoeing.

Figure 2:
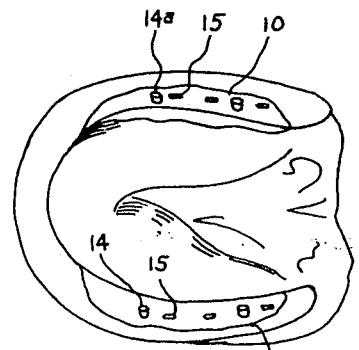
FIG. 2 shows the placement of shims on the hoof.
Figure 7:
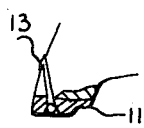
Figure 12:
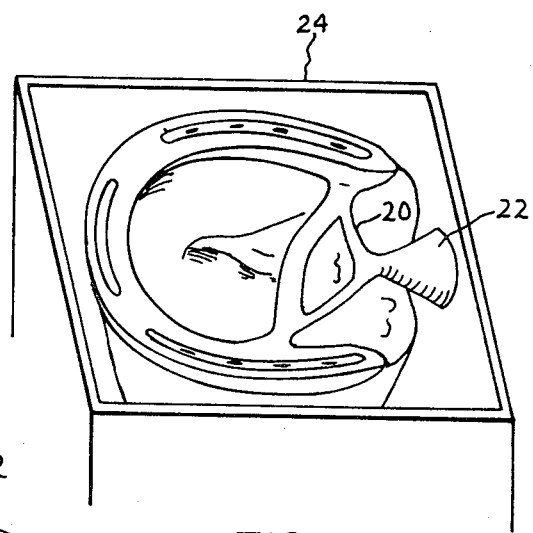
FIG. 12 illustrates a method for casting employed according to the invention.

In accordance with the practice of this invention two approaches to perfectly fitting horseshoes are provided. For the first of these reference is made to FIG. 2. According to this embodiment of the invention the bearing surface is rendered flat by means of cast leveling shims 10 and 12. One method of casting these shims will be described in conjunction with FIG. 12. However, referring to FIG. 2, it is noted that leveling shim 10 is so cast that it fits perfectly in the receded area *a* of the wall so that a surface is provided bearing on the entire width of a horseshoe 11 as shown in FIG. 7. Shim 12 likewise is so formed that one of its surfaces meshes perfectly with the irregularities in the bearing surface shown at *b* in FIG. 1. The opposite surface is flat and level as shown in FIG. 2.

Figure 3:
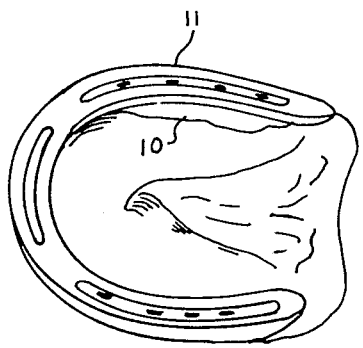
FIGS. 3 and 4 show two types of shoes as fitted to the hoof of the first figure.

As can be seen in FIGS. 1 and 7, shims 10 and 12 in conjunction with the remaining hoof wall surface result in a bearing surface which is eminently suitable for attachment of the shoe to the hoof wall. In order to further assure a better fit of the shoe pins 14 can be formed in or otherwise secured to shims 10 and 12. Shoe 11 can then be adapted, through pin holes, to receive the pins 14 so that the shims will not slip during shoeing and a fit shown in FIG. 3 is obtained. The shims are, of course, also held in place by horseshoe nails 13. These nails are driven through holes 15 in the shims beneath the holes in the shoe.

Figure 4:
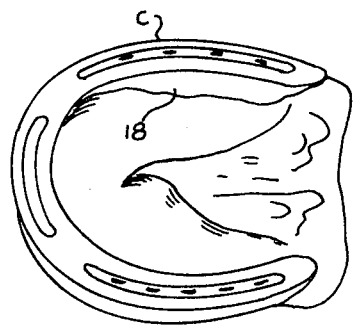
Figure 8:
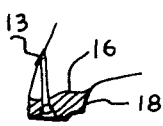

Referring now to FIG. 4, in lieu of the combination of shims with a standard or conventional shoe, the process contemplated herein can be used to fabricate a custom fitted shoe. Again, in FIG. 4 the shoe appears as it would to the farrier nailing it on. The wearing surface, that is the surface against the ground, shown as the upper surface *c* in FIG. 4, looks like a normal shoe. However the opposite side of the shoe which rests against the bearing edge of the hoof wall is not flat and level as in the case of standard shoes. This surface, not visible in FIG. 4, is jagged and irregular. Since it is matched perfectly to the base of the hoof wall, the surface will be level where the base of the wall is level, and it will protrude where the hoof base is irregular. Along the entire bearing surface of the hoof wall this shoe will fit as shown in FIG. 8. In this figure it will be seen that the base of the hoof wall is recessed inwardly at 16. At this point the shoe would fit as does shoe 14 in FIG. 6. However the back side 18 of the shoe projects upwardly against the sloping hoof wall base since the surface of the back side of the shoe is so contoured that it fits against the bearing surface of the hoof wall at virtually every point of the bearing surface. This will best be understood from a more detailed description of the fabrication of the shoe.

Referring now to processes for making leveling shims and custom shoes, initially it must be decided whether the patterns will be formed on the horse's foot or whether a master cast of the foot will be made. In making a master cast, a functional impression, which is an accurate registration of the anatomic form, is taken. In some instances hydrocolloids are used for this purpose. However most of these colloids are gels which require that the water be heated. In making an impression of the horse's foot it is preferred to use a gel which does not require heating to harden or set. Suitable gels are silicones, alginates and rubbery polysulfide polymers (Thiokols).

After removal of the functional gel impression from the foot, it is dried before it has had time to distort. An impression of the foot is then made by filling the impression with an aqueous paste such as gypsum to form the master cast of the foot. Other casts of the foot can, of course, be made for study by the farrier or veterinarian as the case may be. Duplication of the master cast is accomplished in the same way that the initial impression of the foot is made.

In making leveling shims such as 10 and 12, a wax or low melting plastic pattern, a model, of the shim is made to fit the base of the hoof wall as shown in FIG. 2. It will be apparent that as many shims may be made as are necessary to form a perfect bearing surface. When a cast of the foot is used, after the refractory cast has set, in an oven or otherwise, and has been examined for possible defects, the design of each leveling shim is lightly traced on the refractory cast. After the shim pattern is traced, an accurate model of the desired shim is then formed from wax or low melting plastic on the cast. The forming of the shim model consists of applying soft or molten casting wax or plastic over the penciled design on the case until the wax model has the desired size, shape and thickness. The wax models will resemble shims 10 and 12 shown in FIG. 2. Either the plastic model or the final shim will appear as it does in FIG. 2.

After the model is formed a mold is then made, thus providing a cavity for the injection of a hard thermosetting resin, or metal in order to form the actual shim. Although any of the casting or injection molding methods can be used, a desirable method is sprue casting. A sprue is a wax or plastic form 20 attached to a model, eventually to provide an aperture or passageway through which molten metal or liquid plastic flows into a mold to make a casting. Sprues generally terminate in a funnel shaped sprueway such as 22 in FIG. 12 so that the molten metal can be easily injected into the passageways. Adequate sprueways must be provided to insure that remote cavity areas are reached. In addition a bulky portion of the mold should not be reached by a narrow, smaller passageway. Additional sprueways should be provided.

The refractory cast of the foot with the pattern of the leveling shims as formed on the cast is next covered with a mixture of refractory material. This heat resistant hardening material is called an investment. The refractory investing material is generally the same in composition as that used to make the refractory cast. The investment is mixed with sufficient water to be soft enough to conform accurately to the configuration of the model so that it completely covers it. Investing is carried out in a casting ring, or an investment box such as 24 shown in FIG. 12. If a wax sprueway 22 is not used, after the cast model is partially invested, a sprue former resembling 22 is inserted over sprues 20. Frequently a model is invested on a vibrator to insure that the model is accurately reproduced.

After the investment hardens, it is removed from the investing box or ring. The result is a hard block or cylinder. The block is then placed in a furnace which further hardens the investment and burns out the low melting plastic or wax model and the sprues. The thermosetting resin or molten metal can then be injected by pressure or centrifugally forced through the sprueways into the void left by the burned out model. On completing the casting the refractory material is broken away and the cast shim is prepared for application to the horse's foot. To prepare the cast shim, the sprues are cut away and the cast shim is finished and polished. Whether this or some other method of molding is employed will depend on the nature and size of the shim.

It will be apparent that if a cast of the horse's foot is not made the wax pattern will be made on the base of the hoof itself. After the model is formed along the bearing surface of the hoof wall, it will be carefully removed for investment, or so plates can be made for injection or pressure molding. If invested, a layer of investing material will be placed in the bottom of the investing ring or box. The wax model, with spruing attached, will then be placed in the investing material. Investing of the pattern is completed by covering the pattern and sprues.

It will be appreciated that if a custom made shoe such as that shown in FIG. 4 is fabricated the procedure will be the same as that employed in making the shims. However, except in rare instances, metal will be used for the shoe rather than plastic. A wax model of the shoe will be made to fit the entire bearing surface. If a single shim is to be fabricated, it will not be necessary to make a cast of the foot. However in view of the time it will take to make a wax model of a custom shoe it will be much more desirable to make a cast of the foot. In making the wax model of the shoe, any shoe design can be adopted. The process has the advantage that if calks are used they can be formed any place along the shoe and can extend as high as desired. In addition the farrier can make the decision on the placement of retentive holes for nailing, since these holes can be placed differently than they are on the standard type shoe. Either a racing plate or a shoe resembling that in FIG. 4 is formed of wax with its upper surface fitting the base of the hoof wall regardless of any wall defects. The wax shoe model is then sprued and the refractory cast with the wax shoe thereon is invested as described hereinbefore.

One of the important advantages of this invention is that whereas the shim will be evenly aligned with the shoe and the hoof wall on the outside of the horse's hoof, the shim can extend inwardly across a portion of the sole in order to protect that region of the hoof. The sole protecting shim layer must exactly fit down into the sole as closely as fitting back together the two pieces of a broken stick. Obviously, then, the sole covering layer must be cast or molded from an accurately fitting pattern. Generally the shim will be a hard plastic and the sole covering layer somewhat softer, a more elastomeric material being used for the sole covering layer. The sole layer must, however, be sufficiently rigid so that it will remain against the sole. This is made easier by its perfect fit.

Figure 13:
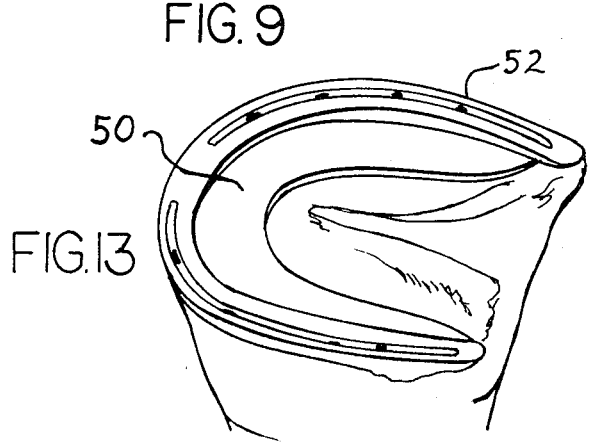
FIG. 13 shows how an injured sole can be protected.

Since the sole covering layer is integral with the shim it will be held in place when the shim is nailed beneath the shoe. Nevertheless, frequently, an injured region of the sole will not be near the shim. In such instances it is preferred to make a single shim fitting beneath the entire shoe. As an example instead of making two shims for imperfections $a$ and $b$ of the bearing wall in FIG. 1 a shim extending the full length of the horseshoe will be made. This has the effect of building up the whole wall. If the sole is injured the shim in this embodiment will extend inwardly beyond the inside of the shoe in a covering layer along the entire length of the shim as shown in FIG. 13. It is again emphasized that the contour of the underside of this covering layer 50 matches that of the sole bottom so that the two dovetail together. When the sole covering layer extends all the way around as layer 50 in FIG. 13 the entire sole up to the bars is, in a sense, built up. When secured under shoe 52 as shown, layer 50 has been found to seat so closely that even dirt does not work its way between the layer and the sole.

As indicated hereinbefore, it is desirable that the sole covering layer be somewhat more flexible than the shim integral therewith. In most instances the same resin can be employed, a flexibilizing agent being incorporated in the portion forming the sole covering layer. It is understood that both plastics when formed must retain their molded shapes, the only difference being that the sole covering layer is somewhat more elastic than the shim.

Thermosetting resins are preferred because in use thermoplastic resins would get hot and lose their shapes. Any of the known thermoset resins can be employed for instance the phenolics, urea-melamines, polyesters, epoxies, diallyl phthalates, cyanurates, and polysulfones. In addition the normal curing agents can be employed to bring about crosslinking such as peroxides, amines, organic acids, amides, and the like. Flexibilizers and other additives can also be incorporated in the resin to further modify the plastic shim.

Figure 10:
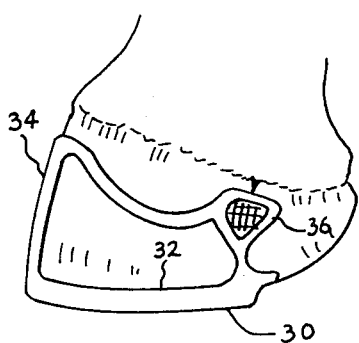
FIGS. 9 through 11 show shoes made by this invention for toe cracks and other hoof defects.
Figure 11:
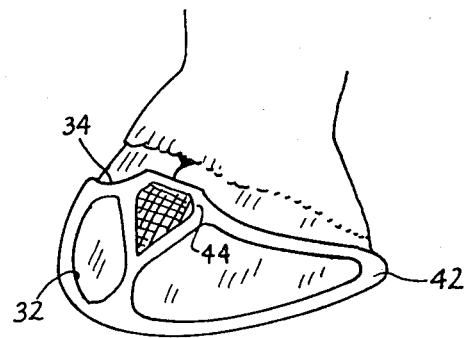
Figure 9:
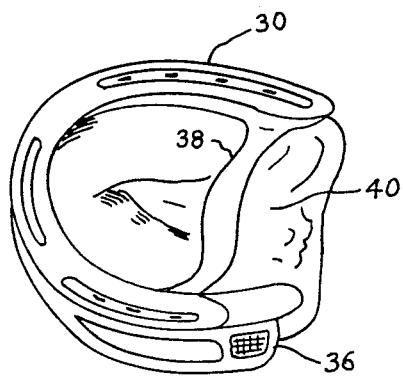

Another advantage of the invention is that special shoes such as those shown in FIGS. 9, 10, and 11 can be made for horses having toe or quarter cracks. Other corrective shoes, plates, or braces can also be made to keep the foot in its natural form. In treating toe cracks, quarter cracks, and other injuries special shoes are made by the process of the invention. In the case of quarter and frontal cracks the lower edge of the hoof wall beneath the crack is cut away slightly above the level of the rest of the hoof wall so that there is no movement of surfaces on each side of the crack, and hence no frictional irritation. After the injury is treated medically a shoe 30 such as is illustrated in FIG. 10 is pressed on. Shoe 30 is provided with a beveled edge 32 overlapping the edge of the hoof wall limiting outer movement thereof. Integral with shoe 30 is brace means 34 which further supports the horny wall. Desirably brace means 34 is in the general form of an inverted "u" or a cross bar, with the upright supports sloping gradually backwardly toward the branches of the shoe. Since the shoe will have been formed on a master cast of the foot, this backward slope of the uprights will be substantially equal to that of the horny wall, and the curvature of the cross bar therebetween will follow that of the hoof surface. Shoe 30 was made for a hoof with a quarter crack. In order to treat the quarter crack without removing the shoe a window 36 is provided in the brace. The window is covered with a grill which further protects the quarter crack. In order to insure pressure on the frog for continued stimulation of a blood supply to the hoof a pressure plate 38 is secured between the branches of shoe 30. As shown in FIG. 9 this plate spans the shoe at a point crossing frog 40. In FIG. 11 is illustrated a similar shoe 42 with a window 44 provided for a toe crack rather than a quarter crack. It is obvious that where other injuries are concerned special shoes can be fabricated to be worn until the injury is corrected. Such shoes will be known to those skilled in the art and given the teachings of this invention these shoes can be readily cast.

What is claimed is:

1. A method of shoeing horses having hoof wall imperfections such that the shoe cannot be completely seated over the entire bearing edge of the hoof wall comprising fitting a horseshoe to the horse's hoof, forming a model of a shim fitting in any unseated gap or space between the bearing edge of the hoof wall and the horseshoe, removing the shim model, forming a mold from said model, casting a shim using said mold, placing the shim in the proper gap or space and attaching the shim and shoe to the horse's hoof.

2. The method of claim 1 wherein the shim is cast using a molten metal.

3. The method of claim 1 wherein the shim is cast using a thermosetting resin.

4. A method of shoeing horses having hoof wall imperfections such that the shoe cannot be completely seated over the entire bearing edge of the hoof wall comprising taking an impression of the hoof with a gel, forming a refractory cast of the hoof from said impression, fitting a horseshoe to the cast, forming a model of a shim fitting in any unseated gap or space between the bearing edge of the hoof wall impression and the horseshoe, removing the shim model, forming a mold from said model, casting a shim using said mold placing the shim in the proper gap or space and attaching the shim and shoe to the horses hoof.

5. The method of claim 4 wherein the shim is cast using a molten metal.

6. The method of claim 4 wherein the shim is cast using a thermosetting resin.

7. A method for fitting horseshoes which results in shielding the sole portion of the foot and its bearing edge comprising taking an impression of the hoof with a gel, fabricating a refractory cast of the hoof from said impression, forming a model of a shim layer for fitting against the horseshoe between and along the bearing edge of the hoof wall, and extending inwardly beyond the bearing edge to form a sole covering layer contoured to seat firmly within the sole portion thereagainst, forming a mold from said model, casting a protective layer using said mold, and fitting and attaching said layer and a shoe to the horse's hoof.

8. Horseshoeing seating against the entire edge portion of a hoof having an imperfect or injured bearing surface resulting in a space between the edge of the hoof wall and the horseshoe comprising a horseshoe correctly shaped and sized to fit the hoof generally except for the imperfect surface; a separate shim and inwardly extending layer portion shaped to fit in the space between shoe and hoof bottom and also convering a portion of the frog when in place, and a means for holding the shim and layer portion against the hoof bottom bearing surface and frog when the shim is in place between the shoe and the injured bearing surface.

* * * * *